United States Patent [19]

Papoff et al.

[11] Patent Number: 4,916,646

[45] Date of Patent: Apr. 10, 1990

[54] SYSTEM FOR SIGNAL TO NOISE SEPARATION FOR ELECTROCHEMICAL INSTRUMENTS

[75] Inventors: Paolo Papoff; Nicolangelo Fanelli; Roger Fuoco, all of Pisa; Dante Guidarini, Pontasserchio, all of Italy

[73] Assignee: Consiglio Nazionale Delle Ricerche, Rome, Italy

[21] Appl. No.: 349,906

[22] Filed: May 9, 1989

Related U.S. Application Data

[63] Continuation of Ser. No. 869,738, Jun. 2, 1986, abandoned.

[30] Foreign Application Priority Data

Jun. 17, 1985 [IT] Italy ................................. 84126 A/85

[51] Int. Cl.⁴ .............................................. H03F 1/26
[52] U.S. Cl. .................................... 364/574; 364/572
[58] Field of Search ............... 364/572, 574, 554, 577, 364/724.01; 375/96; 328/165; 333/166, 196

[56] References Cited

U.S. PATENT DOCUMENTS

| | | | |
|---|---|---|---|
| 3,114,884 | 12/1963 | Jakowatz | 364/572 X |
| 3,631,490 | 12/1971 | Palmieri | 364/572 X |
| 4,093,989 | 6/1978 | Flink et al. | 364/724 X |
| 4,232,364 | 11/1980 | Bibbero | 364/178 X |
| 4,422,156 | 12/1983 | Sano | 364/724 |
| 4,488,240 | 12/1984 | Kapadia et al. | 364/724 X |
| 4,494,214 | 1/1985 | Bernard et al. | 333/166 X |
| 4,539,536 | 9/1985 | White | 333/174 X |
| 4,569,030 | 2/1986 | Butterweck et al. | 364/724 |
| 4,665,499 | 5/1987 | Zacharski et al. | 364/574 X |
| 4,684,989 | 8/1987 | Roeder et al. | 364/574 X |
| 4,694,415 | 9/1987 | Hasenkopf | 364/724 |
| 4,764,971 | 8/1988 | Sullivan | 364/577 X |
| 4,783,753 | 11/1988 | Crimmins | 364/574 |

OTHER PUBLICATIONS

Robinson, E. A., "Principles of Digital Filters", *Geophysics*, vol. XXIX, No. 3, Jun. 1964, pp. 395-404.

Mehra, R., "On the Identification of Variances and Adaptive Kalman Filtering", *IEEE Transactions on Automatic Control*, vol. AC-15, No. 2, Apr. 1970, pp. 175-183.

Booth, T., "Estimation, Prediction and Smoothing in Discrete Parameter Systems", *IEEE Transactions on Computers*, vol. C-19, No. 12, Dec. 1970, pp. 1193-1203.

*Primary Examiner*—Parshotam S. Lall
*Assistant Examiner*—Joseph L. Dixon
*Attorney, Agent, or Firm*—Birch, Stewart, Kolasch & Birch

[57] ABSTRACT

A device for separating a signal from noise and background contribution, particularly for computerized electrochemical instruments. It comprises an experimental data manipulator circuit; an ordering processor connected to the manipulator and arranged to provide the manipulator with the rules for the correct formatting of the experimental data, on the basis of selective operative modes; a command sequencer circuit, which governs the operation of the device on the basis of the values of the characteristic parameters for each mode; an interpolator circuit which execute the selective operative modes and recalculates each formatted data item using algorithms based on interpolation polynominals calculated by the Newton divided differences formula and the Aitken scheme for accelerating the calculation.

16 Claims, 5 Drawing Sheets

SYSTEM FOR SIGNAL TO NOISE SEPARATION FOR ELECTROCHEMICAL INSTRUMENTS

This application is a continuation, of application Ser. No. 06/869,738 filed on Jun. 2, 1986, now abandoned.

This invention relates to a device for separating the signal from the noise and background contribution, particularly for computerised electrochemical instruments.

The use of a computer for controlling electrochemical instruments has been known for some time see for example Anal. Chem., 50(5) Reviews, 14R(1978); Anal. Chem. 52(5) Reviews, 136R(1980); Anal. Chem., 54(5) Reviews, 16R(1982); Anal. Chem., 56(5) Reviews, 15R(1984).

The main advantages of these computerised instruments are: automatic extraction of the required information from the experimental data; the possibility of implementing various electrochemical techniques with a single instrument; and automatic control of the experimental parameters; presentation of the final results in the most appropriate manner, according to the electrochemical technique used.

Known computerised electrochemical instruments suffer from limits on their performance, these limits being due essentially to the incomplete utilisation of the computer potential. In practice, this performance corresponds substantially to the performance of conventional analog instruments of much lower cost, particularly at low concentration levels, where the capacity to separate the noise from the signal and to calculate the background contribution becomes very important.

With regard to noise separation from the signal, this is currently implemented with filtering devices using algorithms based on the moving average, on the ensemble average, or on parabolic least-squares smoothing.

Filtering devices of the first type (see Bunscki Kagaku, 31(8), T55(1982)) are based on the principle of reconstructing the experimental data sequence, which constitutes the unrefined signal, by taking subsequences formed from a predetermined odd number of successive data items and substituing the mean value of these data items for central data item of the subsequence. One of the drawbacks of these devices is that at low signal/noise ratios, the calculation has to be repeated many times to provide good noise suppression, and this can introduce serious distortion into the signal of interest.

Filtering devices of the second type (see Anal. Chem., 52(8), 1174(1980); Anal. Chem. 43(3), 342(1971)) are based on the principle of repeating the measurement m times to obtain m sequences of experimental data which, when added and averaged, give rise to an average sequence. Devices of this second type, which are a conceptually more correct principle, however have serious drawback of requiring a number of measurements to be made which is greater the lower the signal/noise ratio (the noise reduction is proportional to the square root of the number of averaged curves), and this can require very long data acquisition times.

Filtering devices of the third type (see Anal. Chem., 43(3), 342(1971); Anal. Chem. 36(8), 1627(1964)) are based on parabolic smoothing of the experimental data. This consists of calculating a parabola of assigned degree d which on a least-squares basis best fits the experimental data over a range of length l. The value assumed by the thus calculated parabola at the centre of this range is taken as the filtered value of the relative experimental data item. The drawbacks of devices of this type are particularly related to the absence of criteria in choosing the parabola degree d and the length l of the range of data to be considered.

With regard to correcting the background contribution, the known devices are based on approaches generally related to the electrochemical technique used. For example: in sampled d.c. polograhpy and in normal pulse polarography, linear extrapolation of the background contribution is used (see Anal. Chem. Acta, 101, 309(1978)). After being substracted, the curve is "forced" to assume a sinusoidal pattern described by theoretical equations;

in differential pulse techniques (see Anal. Chem., 51(3), 337(1979)), the interpolation is based on a linear or quadratic least-squares fit of the experimental points adjacent to the signal of interest; and in linear scanning and staircase voltametry (see Anal. Chem., 43(11), 1485(1971)), if two consecutive faradaic processes are present, then to calculate the background contribution for the more cathodic signal, a current diminution with $t^{-\frac{1}{2}}$ function is used.

The limits of all these approaches are mainly determined by their poor reproducibility, which confines their application to relatively high concentration levels.

In other known devices, the background contribution correction is made by using a signal measured in the absence of the analyte, under the same experimental conditions (see Anal. Chem., 43(11), 1485(1971); Anal. Chem., 54(13), 1313A(1982)). In this case, besides poor reproducibility, it is impossible to use it in the case of real samples, for which a reference sample can generally not be provided.

The aforesaid drawbacks indicate that it is currently impossible to use these various electrochhemical techniques for measuring concentration values less than the limits given in the following Table A.

TABLE A

| Minimum concentrations (C) measured by conventional instruments for certain electrochemical techniques | |
|---|---|
| | C/M |
| Sampled d.c. polarography | $1 \times 10^{-6}$ |
| Staircase voltametry | $1 \times 10^{-6}$ |
| Normal pulse polarography | $1 \times 10^{-7}$ |
| Differential pulse polarography | $5 \times 10^{-8}$ |
| Fast scanning differential pulse voltametry | $3 \times 10^{-8}$ |

The object of the invention, therefore, is to overcome the limits of the prior art by providing a device for separating the signal from the noise and background contribution which:

(a) allows automatic extraction of the analytical signal of interest under prohibitive signal/noise and signal/background conditions, and in any event for analytical concentration values less than those measurable by known devices;

(b) enables analytical results to be obtained with high precision and accuracy; and (c) is applicable to computerised electrochemical instruments and to any type of analytical instrument which generates signals having characteristics similar to those generated by electrochemical instruments.

SUMMARY

These objects are attained, according to the invention, by a device for separating the signal from the noise and background contribution, particularly for a computerised electrochemical instrument, and comprising:

(a) an experimental data manipulator circuit;
(b) an ordering processor connected to said manipulator circuit and arranged to provide the manipulator circuit with the rules for the correct formatting of the experimental data, on the basis of selective operative modes;
(c) a command sequencer circuit, which governs the operation of the device on the basis of the values of characteristic parameters for each operative mode; and
(d) an interpolator circuit which executes the prechosen function and recalculates each formatted data item using algorithms based on interpolation polynomials calculated by the Newton divided differences formula and the Aitken scheme for accelerating the calculation.

BRIEF DESCRIPTION OF THE DRAWING

A preferred embodiment of the present invention is described in detail hereinafter with reference to the accompanying drawings, in which.

DETAILED DESCRIPTION OF THE INVENTION

Figure 1:
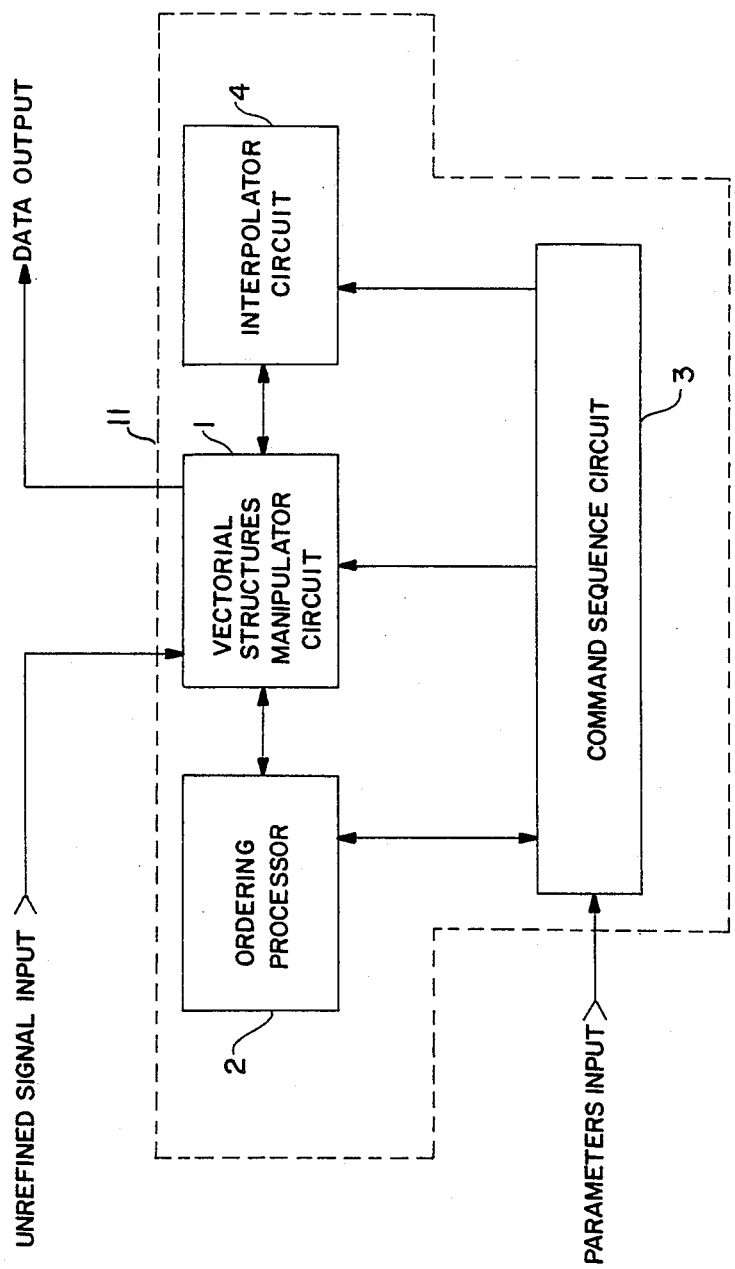
FIG. 1 is a simplified block diagram of the device according to the invention.
Figure 2:
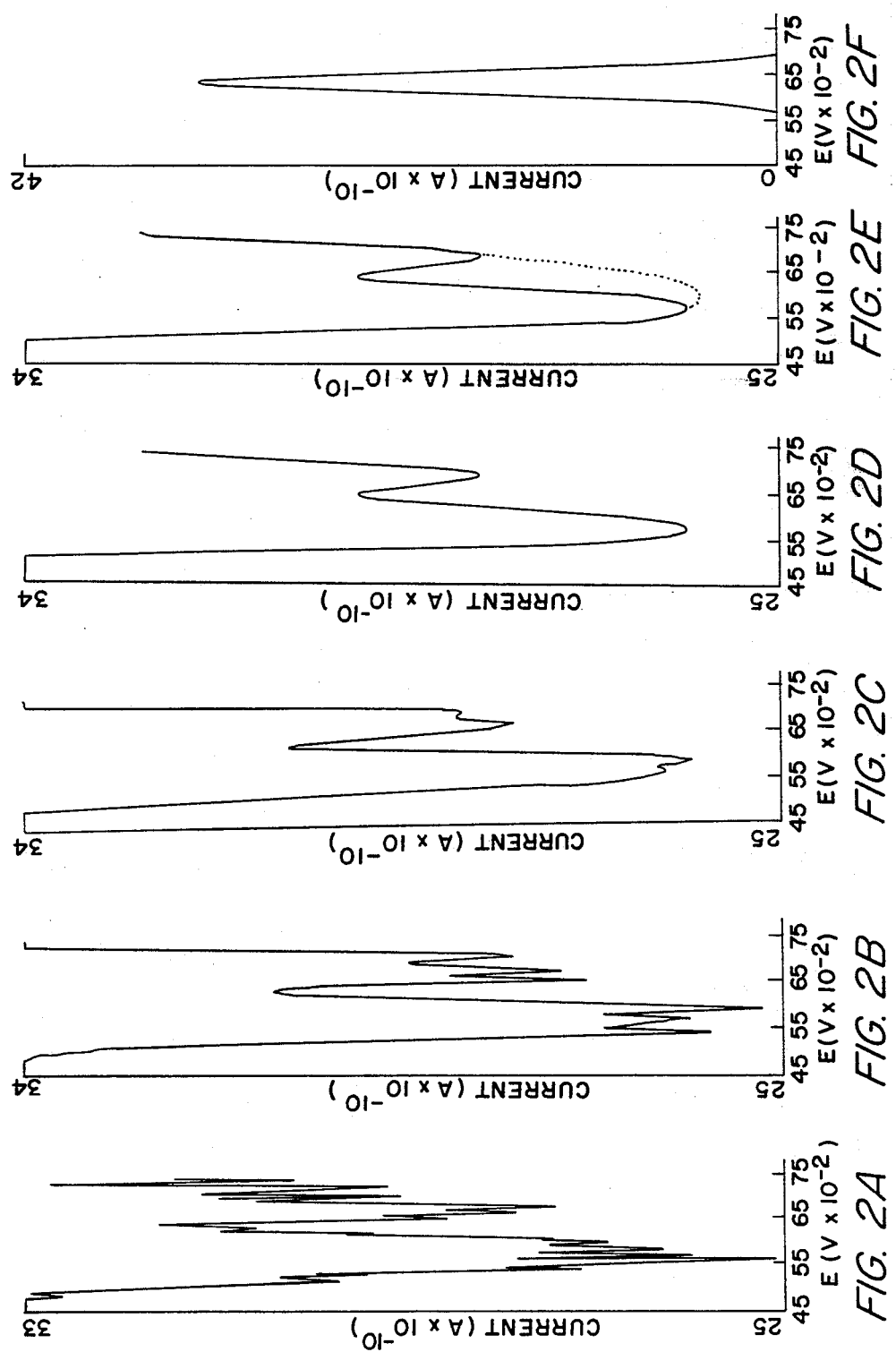
FIGS. 2a, 2b, 2c, 2d, 2e, 2f illustrate six successive stages in the treatment of an unrefined experimental curve entering the device according to the invention for separating the analytical signal of interest.

As can be seen from FIG. 1, the device according to the invention is comprised of, inter alia, a vectorial structures manipulator circuit 1, which receives an unrefined signal (i.e., comprising the analytical signal of interest, including the noise and background contribution), as it arrives from the analytical instrument.

This unrefined signal comprises a sequence of digital numerical values generated by an analog/digital converter, which receives the electrical signal (voltage or current) originating from the analytical instrumentation associated with the device according to the invention. This signal is a function of a parameter being measured (e.g., analytical concentration, temperature, heat quantity etc.). An ordering processor 2 is connected to the manipulator 1 to govern the continuous organisation of the data formatted by the manipulator 1 on the basis of parameters which are iteratively requested from the operator; A command sequencer circuit 3, is coupled to and receives these parameters, to determine the operational manner in which selected operative modes are to be performed. This circuit is connected not only to the ordering processor 2, but also to the vectorial structures manipulator 1 and to an interpolator circuit 4, so as to govern their operation. An interpolator circuit 4, is responsible for reconstructing the final signal. The interpolator circuit is connected to the manipulator 1, from which it receives the formatted data to be processed, and to which it restores the processed data, which is reformatted and then transmitted externally for display.

Further characteristics of the said modules 1, 2, 3 and 4 are described in greater detail during the course of the following description of operation.

Initially, on activating the device, the operator introduces into the command sequencer 3 the following parameters:

(1) the type of function to be performed, i.e., separation of the signal from the noise or separation of the signal from the background contribution;
(2) the width of that porton of an experimental curve (signal) to be recalculated iteratively in separating the signal from the noise (parameter a);
(3) the number of successive iterations of the function over the entire curve in separating the signal from the noise (parameter b);
(4) the width of that portion of the curve to be recalculated iteratively in separating the signal from the background contribution (parameter a');
(5) the total width of the two curve portions to the right and to the left of the portion to be recalculated, which are to be taken into consideration in effecting the recalculation in separating the signal from the noise (parameter c) or in separating the signal from the background contribution (parameter c'); generally the width $l$ of the curve portion to the left of the portion to be recalculated is equal to the width $r$ of the curve portion to the right of the portion to be recalculated and is equal to $c/2$. Consequently if the width of the available curve portion to the left or to the right is less than $l$ or $r$ respectively, the other portion, where possible, will be correspondingly greater so that in each case $l+r=c$ in separating the signal from the noise, and $l+r=c'$ in separating the signal from the background contribution;
(6) the maximum precision level of the mathematical calculation in separating the signal from the noise (parameter e) or in separating the signal from the background contribution (parameter e'). The precision level actually reached during the course of the calculation is also related to automatic convergency criteria based on the difference between successive numerical estimations of the numerical data, as will be clarified hereinafter.

The command sequencer circuit 3 memorises, as standard values, the values of six of seven parameters, namely a, b, c, c', e, e', which can in any event be modified at any time by the operator. The parameter a' has to be introduced at a predetermined time, according to the requirements of the various analytical techniques.

As stated, the manipulator circuit 1 receives the orignial experimental curve in the form of a sequence of numbers generated during the course of the experimental measurement, as is described hereinafter.

If separation of the signal from superimposed noise (filtration) is required, the interpolator 4 considers a curve portion corresponding to sequence of a data points. Using the interpolation polynominals (PPD) calculated by the Newton differences formula and the Aitken solution for accelerating the calculation (see F. B. Hildebrand: "Introduction to Numerical Analysis", McGraw-Hill 1974, chapter 2, section 2.7) the interpolator 4 recalculates, with a given order, each data point of this portion as a function of the two adjacent portions external to the portion itself, or of only one of them if the other is missing (this being done by an iterative process which uses an interpolation polynomial of continually increasing degree), until the absolute value of the difference between the current estimation and that found in the preceding iteration is equal to or less than the predetermined precision value (parameter e) or until this difference is equal to or greater than the absolute value of the difference between the preceding and the third-from-last estimate.

In particular, if $Y_i^{d+k}$ is the interpolation estimation of polynomial degree d+k of the $i^{th}$ point, the process stops if one of the following two inequalities is verified:

$$|Y_i^{d+k} - Y_i^{d+k-1}| \geq |Y_i^{d+k-1} - Y_i^{d+k-2}| \qquad (1)$$

$$|Y_i^{d+k} - Y_i^{d+k-1}| \leq e \qquad (1a)$$

The interpolator 4 then excludes the first point of the considered portion and includes the point successive to the last, to then repeat the iterative process, until all the data points have been recalculated.

Figure 4A:
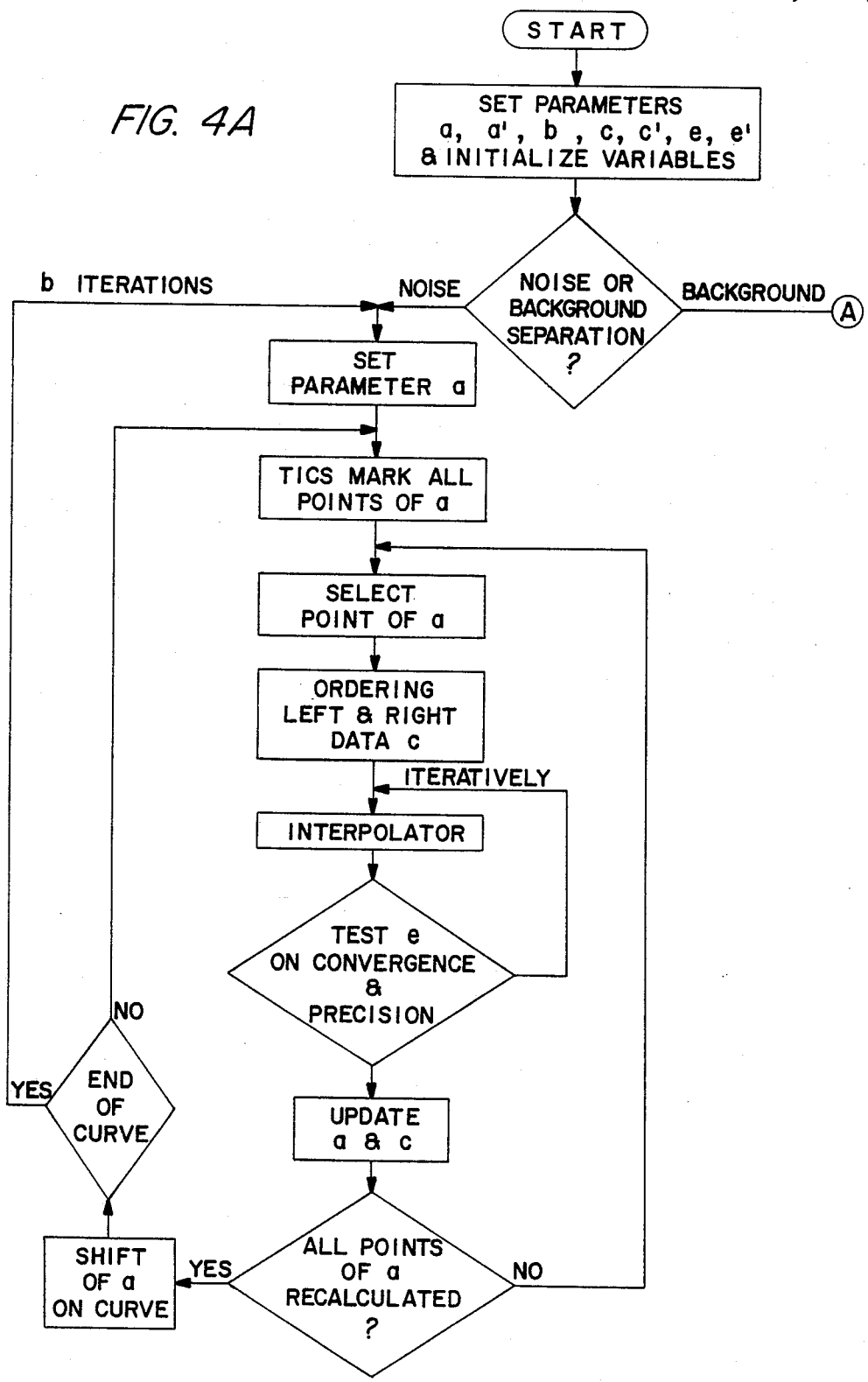
FIG. 4 is a flow chart illustrating the operation of the subject invention.
Figure 4B:
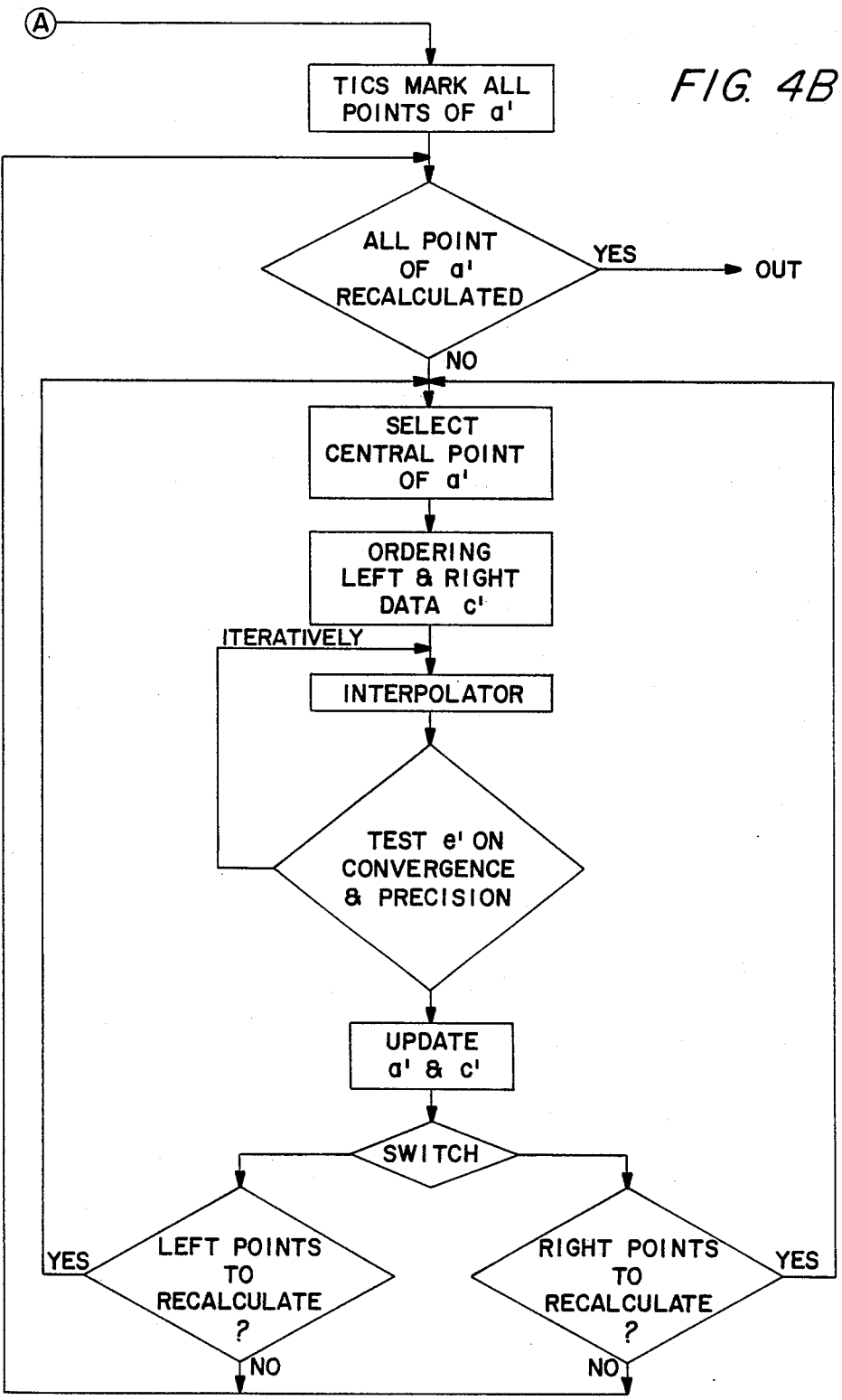

This operation is repeated b times and is further illustrated at the left side portion of the flow chart shown in FIG. 4.

Theory states that the points thus recalculated, and thus the profile of the reconstructed curve, correspond to the experimental curve with the noise removed.

If it is required to separate the background contribution, which is an operation generally done after separating the signal from the noise, and is therefore carried out on a signal from which the noise has been removed, the parameters a', c', e' are taken into consideration as stated, the latter two having the same meaning as the parameters required for the preceding filtration function; however, the parameter a' corresponds to the curve portion over which the background contribution is to be calculated.

In order to reconstruct the eliminated curve portion, the interpolator 4 calculates, again using the PPDs, the central point of this portion as a function of the two segments containing a total of c' experimental points, to the left and to the right (interpolation) or only to the left (extrapolation). It then proceeds in the same manner, recalculating the central points of the two portions into which the portion to be reconstructed has been divided by the first calculated central point, and so on. Again in this case the points are calculated by an iterative process which at each cycle uses an interpolation polynomial of an ever higher degree, until one of the two inequalities (1) or (1a) is verified. This is shown by the right side portion of the flow chart shown in FIG. 4.

Theory states that the curve reconstructed in this manner corresponds substantially to the curve relative only to the background contribution, and if this is substrated from the initial curve, a result is the curve of only the analytical signal of interest.

On termination of this iterative process, the interpolator 4, on request, restores to the manipulator 1 either the data sequence relative to the base line thus calculated, or the difference between the initial curve and the reconstructed base line. The manipulator 1, in both cases, reformants the data and makes them available to the outside for display or recording in the mass memory. At this point the device has performed its function, and the command sequencer 3 prepares to receive new instructions and parameters for performing the same or a new function.

The following example will further clarify the invention. It will be assumed for the purposes of description that the manipulator 1 receives a sequence of n pairs ($X_i$, $Y_i$) of numbers representing the experimental data obtained during a measurement by the instrument. In particular, they represent the values of the two dependent and independent physical variables. In the case of electrochemical measurements, they can represent the electric current passing between the electrodes inserted into the measurement cell, and the value of the applied potential.

The device then requests from the operator the operational mode to be performed and the value of the parameters which characterise it (should the operator which to change these from the standard values memorised).

Having chosen the operational mode (for example signal filtration followed by separation of the background contribution) and having introduced the parameters a, b, c, e for the filtration stage (the parameters a', c', e' for separating the background contribution wil be requested later), the ordering process 2 defines, on the basis of the introduced parameters, the rules or procedures to be used by the manipulator 1 to format the data, i.e., to transform the sequence of n input data items into a sequence of n formatted data items:

$$A_{1,j}, A_{2,j}, A_{3,4}, \ldots A_{i,j}, A_{n,j} \qquad (2)$$

which are then fed to the interpolator 4 for executing the required function.

In (2), $A_{i,j}$ indicates the $i^{th}$ data item of the sequence, recalculated by the $j^{th}$ interpolation. Obviously j=0 corresponds to the unrefined data. (See curve 2a).

For separating the analytical signal from the noise, the interpolator 4 considers the first a unrefined data items, i.e. the subsequence $$A_{1,0} \ldots A_{a,0} \qquad (3)$$

and constructs the interpolation polynomial $P^{(d)}(x)$ of degree d (with d<c) calculated by the following Newton divided differences formula:

$$P^{(d)}(x) = \frac{P^{(d-1)}(x)(X_{a+d+1} - x) - Q^{(d-1)}(x)(X_{a+d} - x)}{X_{a+d+1} - X_{a+d}} \qquad (4a)$$

where $P^{(d-1)}(x)$, $Q^{(d-1)}(x)$ are independent polynomials of degree d=1. For d=1:

$$P^{(1)}(x) = \frac{P^{(0)}(x)(X_{a+2} - x) - Q^{(0)}(x)(X_{a+1} - x)}{X_{a+2} - X_{a+1}} \qquad (4b)$$

where:

$$P^{(0)}(X) = A_{a+1,0}$$

$$\text{and } Q^{(0)}(X) = A_{a+2,0}$$

Using these polynomials, it recalculates the value of $A_{1,0}$ as a function of the values $A_{a+1,0}, \ldots A_{a+c,0}$, i.e. of the c data items of the sequence (2) present to the right of the a data items to be recalculated. As will be clear hereinafter, the parameter c is the maximum number of total data items in the calculation and present to the right and to the left of the subsequence to be recalculated. Because of the fact that in this stage the subsequence (3) does not have data to the left, c data items to the right are obviously taken into consideration. This first recalculation is followed a subsequent recalculation. If the data item $A_{1,2}$ thus recalculated differs from the data item $A_{1,1}$ by more then e, the interpolator 4 carriers out a new recalculation after increasing the degree of the interpolation polynomial by one, thus using the following polynomial:

$$P^{(d+1)}(x) = \frac{P^{(d)}(x)(X_{a+d+2} - x) - Q^{(d)}(x)(X_{a+d+1} - x)}{X_{a+d+2} - X_{a+d+1}} \quad (5)$$

The operation is reiterated until one of the two conditions (1) or (1a) is verified.

At the end of this stage, the experimental data item A has been transformed into the recalculated data item $A_{1,k1}$.

The interpolator 4 then executes the same operations on the experimental data item $A_{2,0}$ which becomes transformed into the data item $A_{2,k2}$ and so on, until the initial sequence (2) is transformed into the sequence $$A_{1,k_1}, A_{2,k_2}, \ldots A_{i,kj} \ldots, A_{a,ka}, A_{a+1,0} \ldots A_{n,0} \quad (6)$$

in which the first a data items have been recalculated, the next n-a data items are the initial ones, and $k_i$ indicates the number of successive recalculations to which each data item has been subjected.

The interpolator 4 then considers the subsequence:

$$A_{2,k_2}, A_{3,k_3}, \ldots A_{a,ka}, A_{a,ka}, A_{a+1,0} \quad (7)$$

i.e. the subsequence of a data items of the sequence (6), shifted through one position with repsect to the subsequence (3), and for each data item of this subsequence (7) effects the recalculation applying the same procedure and using again a total of c data items of the subsequence (6) In this case only the data item $A_{1,k1}$ to the left, and the data items from $A_{a+2,0}$ to $A_{a+1+c,0}$ to the right is considered).

On termination of this recalculation operation, a new sequence $$A_{1,k_1}, A_{2,k'_2}, \ldots A_{a,k'a}, A_{a+1,k'a+1}, A_{a+2,0}, \ldots A_{n,0} \quad (8)$$

is obtained in which the subscripts $k_i$ indicate the number of iterations to which each data item has been subjected in recalculating the first subsequence (3), and the subscripts $k'_i$ indicate the number of iterations to which each data item has been subjected in recalculating the subsequence (3) and the subsequence (7).

The interpolator 4 then proceeds with the next subsequence $$A_{3,k'_3}, \ldots A_{a+1,k'a+1}, A_{a+2,0} \quad (9)$$

and so on.

On termination of this first cycle of recalculations, which has led to a new sequence being obtained and in which all the data items have been recalculated at least once by the indicated method, further cycles to a total of b are repeated (the curves 2b and 2c are representative of two intermediate sequences of recalculated data items.

Theory states that on termination of this iterative recalculation procedure, a sequence of recalculated data items is obtained which represents the curve of the input signal separated from the noise. Please note curve 2d. From this sequence $$A'_1, A'_2 \ldots A'_n \quad (10)$$

the interpolator 4 separates the background contribution after requesting the value of the single parameter a', as the other parameters (c', e') have standard values.

Using the procedure described for the filtration, the interpolator 4 considers the data sequence (10) obtained from the preceding filtration operation, and defines the a' data items corresponding to that curve portion to be recalculated, i.e. considers, on the instructions of the operator, the subsequence $$A'_i, \ldots A'_{i+a'-1} \quad (11)$$

which must be recalculated with the PPDs on the basis of the two subsequences $$A'_{i-1}, \ldots A'_{i-1} \quad (12)$$

$$A'_{i+a'}, \ldots A'_{i+a'+r-1} \quad (13)$$

where $$l + r = c'$$

These subsequences are respectively to the left and to the right of the subsequence (11) in the case of interpolation. In the case of extrapolation (r=0), only the subsequence (12) is used.

Again applying the interpolation polynomial $$P^{(d')}(x) = \frac{P^{(d'-1)}(x)(X_{(a'+d'+1)} - x) - Q^{(d'-1)}(x)(X_{a'+d'} - x)}{X_{a'+d'+1} - X_{a'+d'}} \quad (14)$$

of degree d'<c', the central point of the subsequence (11) is recalculated iteratively as a function of the data of the two subsequences (12) and (13) (or only (12)); the iteration stops at the degree k if one of the following two inequalities is verified:

$$\left| A'_{\frac{i+a'}{2}, d'+k} - A'_{\frac{i+a'}{2}, d'+k-1} \right| \leq e' \quad (15)$$

$$\left| A'_{\frac{i+a'}{2}, d'+k} - A'_{\frac{i+a'}{2}, d'+k-1} \right| \geq \left| A'_{\frac{i+a'}{2}, d'+k-1} - A'_{\frac{i+a'}{2}, d'+k-2} \right| \quad (15a)$$

Using the same criteria, the central points of the two portions into which the curve has been divided by the first central point are recalculated, and so on.

At the end of this procedure, when all the points of the original sequence (11) have been recalculated, a data sequence is obtained corresponding to the background contribution alone (see curve 2e), and if this is subtracted from the former it provides a data sequence corresponding to only the analytical signal of interest (see curve 2f).

These data are then transferred to the manipulator 4 for reformatting and feeding to the outside for display or for recording in the mass memory.

In this way, each i experimental point is recalculated by a $d_i$ degree polynomial on the basis of the neighboring points belonging to the interval $\theta_i = d_i + 2$. The values d and θ are not defined a priori by the user, but are changeable piecewise.

Figure 3:
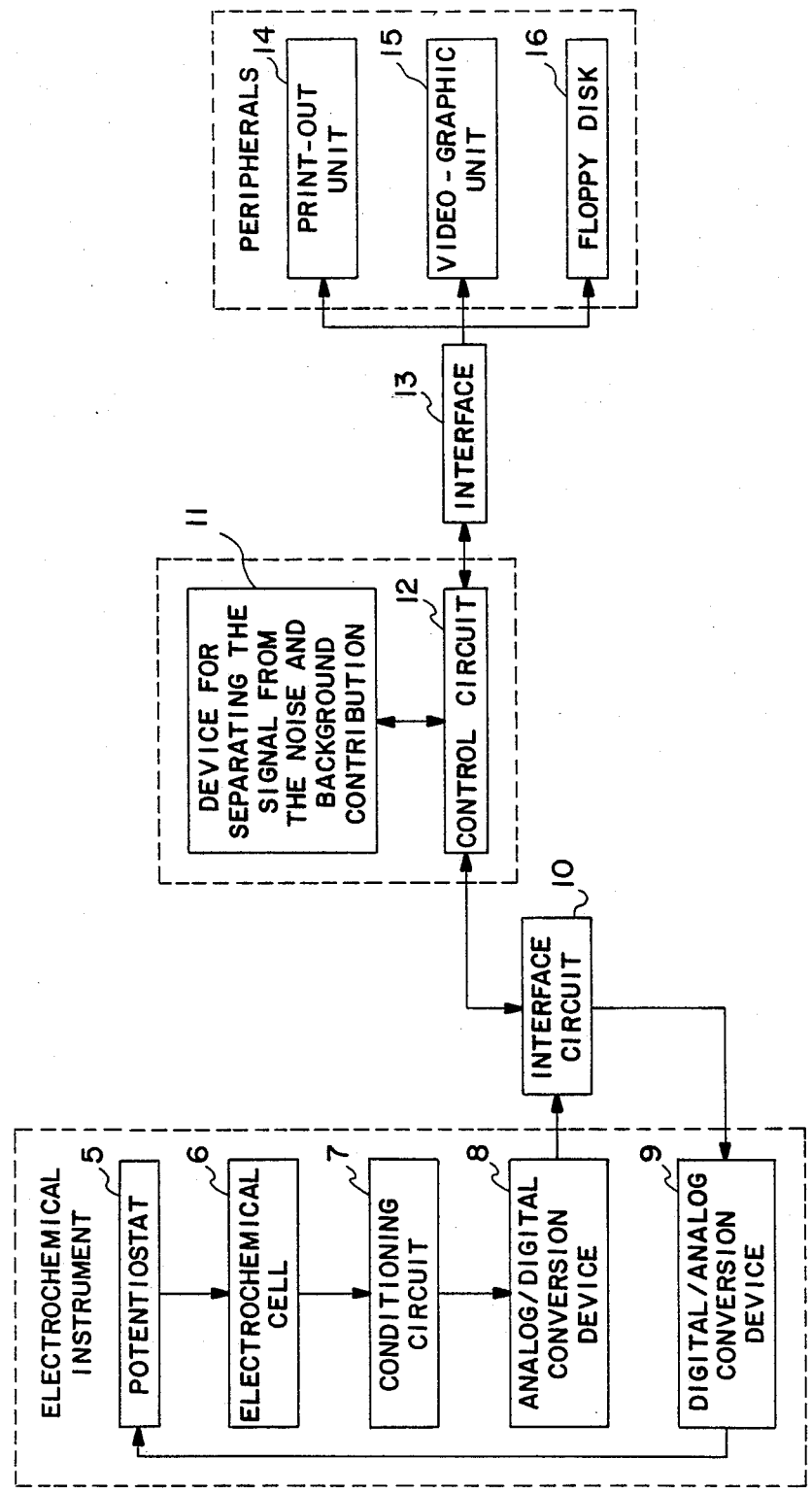
FIG. 3 is a block diagram of an electrochemical instrument using a device according to the invention.

The described device finds advantageous application in the analytical instrumentation field whenever the instrument under consideraton generates signals which are characterised by an associated noise (electrical and-/or mechanical) having an amplitude which can be even greater than that of the signal itself, provided it is of a frequency sufficiently high compared with the signal, and by a background contribution which follows a pattern enabling it to be reconstructed by interpolation or extrapolation. In particular, one advantageous application of the device according to the invention is its use in electrochemical instruments, for example of the type illustrated diagrammatically in FIG. 3. It comprises a traditional electrochemical cell 6 connected to a potentiometer 5 which is controlled by the operational unit (see Anal. Chem., 51(3), 337(1979); Anal. Chem., 43(11), 1485(1971)) through a digital-analog conversion device 9 and an interface circuit 10.

The cell signal is fed by way of an electronic conditioning circuit 7 comprising a current to voltage converter and a variable gain amplifer, to an analog to digital conversion device 8 for conversion into a sequence of (digital) numbers which, by way of the interface circuit 10, enters the device 11 according to the invention for filtration and subtraction of the background contribution. This device, containing a SBC (single board computer) and a memory board, also governs the control of the electrochemical instrumentation by means of a control circuit 12, and the connection to the various terminals (peripherals) by means of an interface 13.

The process signal leaving the device 12 is fed through an interface 13 to the peripherals, which can comprise a print-out unit 14, a video-graphic unit 15 for its display, and a floppy disk 16 for its recording.

As in the case of all known computerised electrochemical instruments, the present apparatus also offers high performance in terms of numerous possible electrochemical techniques, automatic control of instrument parameters, and presentation of experimental data in the most appropriate manner. However in constrast to known computerised electrochemical instruments, the instrument using the device 11 according to the invention allows analytical extraction of the required information under prohibitive signal/noise and signal/background ratio conditions, which in terms of minimum measurable concentration can be up to 20 times less than that of known devices, according to the technique applied.

The following Table B indicates the minimum concentration which can be measured by the instrument according to the invention (a) for certain electrochemical techniques, and the corresponding concentration values measurable by known electrochemical instruments (b).

TABLE B

Minimum concentrations measured by the instrument according to the invention, compared with values measurable by known devices

| | (a) | (b) |
|---|---|---|
| Sampled d.c. polarography | $2 \times 10^{-7}$ | $1 \times 10^{-6}$ |
| Staircase voltametry | $5 \times 10^{-8}$ | $1 \times 10^{-6}$ |
| Normal pulse polarography | $5 \times 10^{-8}$ | $1 \times 10^{-7}$ |
| Differential pulse polarography | $1 \times 10^{-8}$ | $5 \times 10^{-8}$ |
| Fast scan differential pulse voltametry | $5 \times 10^{-9}$ | $3 \times 10^{-8}$ |

Finally, the following Table C shows the reproducibility of the parameters characteristic of the analytical signal ($E_p$ and $i_p$) for two electrochemical techniques considered by way of example.

TABLE C

Reproducibility of $i_p$ and $E_p$ in measurements made by staircase voltametry (SV) and fast scan differential pulse voltametry (FSDPV) on a 0.1 M NaCl solution containing $Cd^{++}$.

| Electrochem. technique | C (M) | $-E_p$ (mv) | s.d.* | $i_p/C$ (A/M) | s.d.* |
|---|---|---|---|---|---|
| SV | $5 \times 10^{-8}$ | 640. | 3. | 0.020 | $2 \times 10^{-3}$ |
| | $5 \times 10^{-5}$ | 637.3 | 0.4 | 0.021 | $2 \times 10^{-4}$ |
| FSDPV | $5 \times 10^{-9}$ | 628. | 2. | 0.062 | $5 \times 10^{-3}$ |
| | $5 \times 10^{-6}$ | 625.5 | 0.4 | 0.058 | $7 \times 10^{-4}$ |

*The s.d. values were calculated on the basis of 5 measurements.

Having thus shown and described what is at present considered to be the preferred embodiment of the subject invention, it should be noted that the same has been made by way of illustration and not limitation. Accordingly, all modifications, alterations and changes coming within the spirit and scope of the invention as set forth in the appended claims are herein meant to be included.

We claim:

1. A device for separating a signal from noise and background contribution, particularly for computerized electrochemical instruments providing an experimental data curve, comprising:
   an experimental data manipulator circuit (1);
   an ordering processor (2) connected to said manipulator circuit (1) and arranged to provide the manipulator circuit with the procedures for the correct formatting of the experimental data on the basis of a plurality of selective operative modes;
   a command sequencer circuit (3) controlling the operation of the device of the basis of values of characteristic parameters selected for each of said operative modes; and
   an iterative interpolator circuit (4), which recalculates each data point (i) of a plurality of discrete data points within plural portions or segments of said curve using algorithms based on polynomial interpolation of data points within a said portion of said curve as a function of at least one adjacent portion of said curve external to said portion and calculated by the Newton interpolating formula with divided differences and the Aitken scheme for accelerating the calculation whereby each experimental point is recalculated by a $d_i$ degree polynomial on the basis of neighboring points belonging to an interval ($\theta$) of a plurality of data points, where $\theta = d_i + 2$ data points, the $d_i$ degree polyonomial being a polynomial through which the conditions of absolute convergence are reached.

2. A device as claimed in claim 1 wherein an input signal is applied to the command sequencer circuit (3) in response to a command for a said operative mode to be performed and wherein said operative modes include separation of the signal from the noise and separation of the signal from the background contribution.

3. A device as claimed in claim 2 wherein an input signal is applied to the command sequencer circuit (3) for a predetermined parameter (a) of said characteristic parameters corresponding to the width of said portion of said experimental curve to be recalculated iteratively for separating the signal from the noise.

4. A device as claimed in claim 2 wherein an input signal is applied to the command sequencer circuit (3) for a predetermined parameter (b) of said characteristic parameters corresponding to the number of successive recalculations to which the entire curve of said experimental data is subjected in separating the signal from the noise.

5. A device as claimed in claim 2 wherein an input signal is applied to the command sequencer circuit (3) for a predetermined parameter width of said portion of said experimental curve to be recalculated iteratively in separating the signal from the background contribution.

6. A device as claimed in claim 2 wherein an input signal is applied to the command sequencer circuit (3) for a predetermined parameter (c) of said characteristic parameters corresponding to the total width of curve portions to the right and/or to the left of said portion of said experimental curve to be recalculated and which are taken into consideration when effecting a separation of the signal from the noise.

7. A device as claimed in claim 2, an input signal is applied to the command sequencer circuit (3) for a predetermined parameter (c') corresponding to the total width of two curve portions to the right and/or to the left of said portion of said experimental curve to be recalculated and which are taken into consideration when effecting a recalculation in the separation of the signal from the background contribution.

8. A device as claimed in claim 2 wherein an input signal is applied to the command sequencer circuit (3) for a parameter (e) corresponding to a maximum precision level of a mathematical calculation effected by an algorithm utilized in separating the signal from the noise.

9. A device as claimed in claim 2 wherein an input signal is applied to the command sequencer circuit (3) for a parameter (e') corresponding to a maximum precision level of the mathematical calculation effected by an algorithm utilized in separating the signal from the background contribution.

10. A device as claimed in claim 1, wherein the command sequencer circuit (3) includes a circuit for storing standard values of one or more of said characteristic parameters (a, b, c, c', e, e') and which can be selectively modified by an operator.

11. A device as claimed in claim 3 wherein an input signal is applied to the command sequencer circuit (3) for a predetermined parameter (b) corresponding to the number of successive recalculations to which the entire said curve portion is subjected for separating the signal from the noise.

12. A device as claimed in claim 4 wherein the command sequencer circuit (3) includes a circuit for storing standard values of one or more of said characteristic parameters (a, b, c, c', e, e'), and which can be selectively modified by an operator.

13. A device as claimed in claim 5 wherein the command sequencer circuit (3) includes a circuit for storing standard values of one or more of said characteristic parameters (a, b, c, c', e, e'), and which can be selectively modified by an operator.

14. A device as claimed in claim 14 wherein the command sequencer circuit (3) includes a circuit for storing standard values of one or more of said characteristic parameters (a, b c, c', e, e') and which can be selectively modified by an operator.

15. A device as claimed in claim 7 wherein the compound sequencer circuit (3) includes a circuit for storing standard values of one or more of said characteristic parameters (a, b, c, c', e, e'), and which can be selectively modified by an operator.

16. A device as claimed in claim 8, wherein the command sequencer circuit (3) includes a circuit for storing standard values of one or more of said characteristic parameters (a, b, c, c', e, e'), and which can be selectively modified by an operator.

* * * * *